Figure 1:
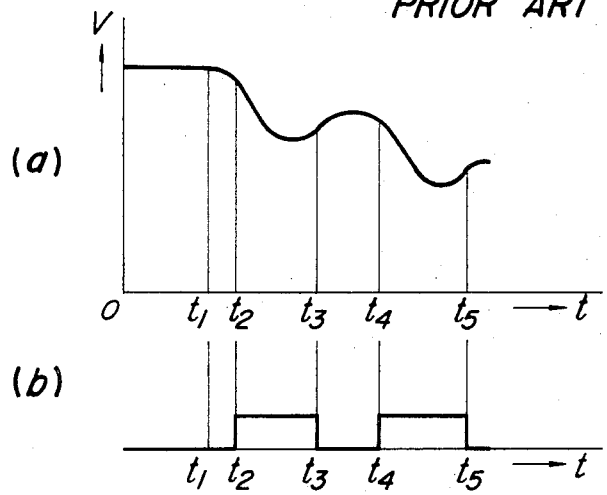

United States Patent [19]
Nakamura et al.

[11] 3,807,811
[45] Apr. 30, 1974

[54] ANTI-SKID CONTROL SYSTEM FOR VEHICLES

[75] Inventors: Akira Nakamura; Hiroshi Arai, both of Toyota; Atsutoshi Okamoto, Toyohashi; Shunji Okumura, Kariya, all of Japan

[73] Assignees: Nippondenso Co., Ltd., Kariya-shi, Aichi-Ken; Toyota Jidosha Kogyo Kabushiki Kaisha, Toyota-shi, both of, Japan

[22] Filed: Sept. 9, 1971

[21] Appl. No.: 178,878

[30] Foreign Application Priority Data
Sept. 11, 1970 Japan.............................. 45-80268

[52] U.S. Cl............................. 303/21 BE, 188/181 C
[51] Int. Cl............................................... B60t 8/08
[58] Field of Search............. 188/181 C; 303/20, 21; 317/5; 324/160–161; 340/263

[56] References Cited
UNITED STATES PATENTS

| | | |
|---|---|---|
| 3,604,760 | 9/1971 | Atkins........................... 303/21 CG |
| 3,584,921 | 6/1971 | Crawford........................ 303/21 BE |
| 3,635,530 | 1/1972 | Packer et al. ..................... 303/21 P |
| 3,647,267 | 3/1972 | Scharlack......................... 303/21 P |
| 3,650,575 | 3/1972 | Okamoto..................... 188/181 C X |
| 3,583,773 | 6/1971 | Steinbrenner et al. ......... 303/21 EB |
| 3,705,748 | 12/1972 | Ochiai............................ 303/21 BE |
| 3,713,705 | 1/1973 | Michellone et al................ 303/21 P |
| 3,663,070 | 5/1972 | Scharlack......................... 303/21 P |

Primary Examiner—Trygve M. Blix
Assistant Examiner—Stephen G. Kunin
Attorney, Agent, or Firm—Cushman, Darby & Cushman

[57] ABSTRACT

An anti-skid control system for wheeled vehicles where a wheel speed signal is separately compared with two reference signals during braking operations. One of the reference signals is maintained at a fixed increment below the other and the result of the separate comparisons is used to control a memory or flip-flop which, in turn, produces a brake release signal.

6 Claims, 8 Drawing Figures

ANTI-SKID CONTROL SYSTEM FOR VEHICLES

The present invention generally relates to anti-skid control systems for vehicles and more particularly to a vehicle anti-skid control system designed to prevent the so-called skidding of a running vehicle, giving rise to the complete loss of steering capacity of the wheel and the abnormal spinning of the vehicle body due to the locked wheel which would be induced when, upon rapid braking of the running vehicle with an excessively large braking force, the torque (hereinafter referred to as a brake torque) derived from the frictional force developed between the brake shoe and the brake drum by the braking force urging the brake shoe against the brake drum becomes excessively larger than the torque (hereinafter referred to as a tire torque) developed about the center of the wheel by the reaction force acting on the road surface with which the wheel is in contact.

The conventional anti-skid control systems for vehicles have been developed toward the same object of providing a system which ensures that the speed of a vehicle is slowed down without locking the wheels when the brakes are applied. Most of these conventional systems have been designed such that the rate of decrease of the peripheral wheel speed per a very small unit time, that is, the peripheral wheel deceleration is detected either mechanically or electrically and thus, when this peripheral deceleration has exceeded a predetermined value, the braking force applied to the wheel is reduced forcedly independent of the driver's will and irrespective of whether the brake pedal is being depressed, thereby reducing the brake torque to prevent the locking of the wheel and hence the skidding of the vehicle due to the locked wheel.

Figure 2:
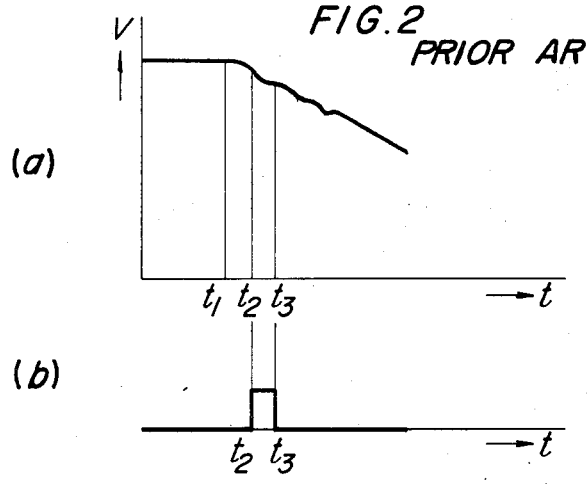

The principle of operation of devices of the above type will now be explained with reference to FIGS. 1 and 2 of the accompanying drawings in each of which the abscissa represents the time $t$. In FIGS. 1(a) and 2(a) the ordinates represent the wheel speed $v$, while in FIGS. 1(b) and 2(b) the ordinates represent a signal (hereinafter referred to as a braking force reducing signal) for forcibly reducing the braking force. Now referring to FIGS. 1(a) and 1(b), the momentarily changing wheel speed will be stored until a time $t_1$ at which the driver of a vehicle depresses the brake pedal to produce a brake torque, so that the wheel speed starts to drop owing to the brake torque produced after the time $t_1$ and the instant that the wheel speed exceeds a predetermined deceleration at a time $t_2$ a braking force reducing signal is generated to reduce the brake torque. Then, after the time $t_2$ the wheel speed still continues to drop for a little while owing to the moment of inertia possessed by the wheel or the delay time in the mechanical operation of the aforesaid mechanism and thereafter, assisted by the tire torque provided by the road surface through the propulsion caused by the inertia of the vehicle body, the wheel starts to pick up speed again so that when it is perceived that the wheel speed has sufficiently risen at a time $t_3$, the braking force reducing signal which has been continuously produced is extinguished to stop the braking force reducing action. Thereafter, similar operations as described above continue so long as the braking force is being applied. In this manner, by trying to set the aforesaid predetermined deceleration to an ideal value that would prevent the wheel from locking up in accordance with the conditions of road surface throughout a brake application, it has been attempted to ensure that the wheel never locks before the vehicle body comes to a standstill and hence the vehicle is never allowed to skid.

However, with the conventional devices of the type described above, where the friction coefficient of a road surface is so large that after the time $t_2$ the peripheral wheel speed tends to drop to a smaller extent and then rise immediately, the braking force reducing signal would be produced successively at a very short period, whereas the braking force reducing mechanism, owing to a considerable delay attended by the mechanical operation thereof, would find it impossible to respond to the braking force reducing signals produced at such very short period or alternatively even if it were not impossible for the mechanism to do so the braking force could be reduced only for a very short period of time, thus ultimately allowing the wheel to lock. In particular, if this anti-locking action is required on the driven-wheels, there is a problem in that on a road surface with a small friction coefficient the tire torque of a sufficient degree cannot be obtained when the braking pressure is reduced and moreover such insufficient tire torque, when coupled with the engine braking force, tends to prevent the peripheral wheel speed from rising sufficiently, thereby extending the stopping distance considerably.

The main object of the present invention is to provide an anti-skid control system for vehicles comprising a wheel speed voltage generator for generating a wheel speed voltage corresponding to the wheel speed, a reference wheel speed voltage generator for generating a first reference wheel speed voltage corresponding to a first reference wheel speed and a second reference wheel speed voltage corresponding to a second reference wheel speed, said first reference wheel speed voltage being such that when said wheel speed voltage attains a predetermined deceleration said first reference wheel speed voltage will decrease assuming said wheel speed voltage as its initial speed voltage, said second reference wheel speed voltage being lower than said first reference wheel speed voltage by a value corresponding to a predetermined speed difference, comparator means for comparing said first reference wheel speed voltage with said wheel speed voltage and said second reference wheel speed voltage with said wheel speed voltage, and a memory circuit for generating a braking pressure reducing signal when its output varies according to the result of the first comparison in said comparator means and a braking pressure restoring signal when its output changes according to the result of the second comparison in said comparator means. According to this control system, the wheel speed can be caused to decrease according to the predetermined first and second reference wheel speeds to thereby efficiently decelerate the wheel without locking the wheel, and moreover even if, in this case, the braking pressure reducing means had any delay attended by the mechanical operation thereof, such a delay would not be allowed to disturb the normal operation for decelerating the wheel according to the reference wheel speeds, since the time duration of the braking pressure reducing signal is controlled such that it always corresponds to the existing peripheral wheel deceleration thereby properly compensating for the delay in the operation of the braking pressure reducing means and preventing the stopping distance from becoming longer. Thus, the anti-skid control system according to the present invention is capable of completely preventing a vehicle from skidding owing to locked wheels and thus it greatly contributes toward the security of traffic.

According to the control system of the present invention, a wheel speed voltage corresponding to the wheel speed is generated so as to obtain a first reference wheel speed voltage adapted such that when said wheel speed voltage has attained a predetermined deceleration the first reference wheel speed voltage decreases with said wheel speed voltage as its initial speed voltage and a second reference wheel speed voltage lower than the first reference wheel speed voltage by a value corresponding to a predetermined speed difference, whereby the first reference wheel speed voltage is compared with the wheel speed voltage and the second reference wheel speed voltage is compared with the wheel speed voltage so that a memory circuit produces a braking pressure reducing signal when its output changes according to the result of the latter comparison, while the memory circuit produces a braking pressure restoring signal when its output changes according to the result of the former comparison. Thus, this control system is capable of efficiently decelerating the wheel without locking the wheel in accordance with the first and second reference wheel speeds which decrease with predetermined deceleration rates. Furthermore, the control system of the present invention has a remarkable effect in that even if the braking pressure modulating means had any delay in the mechanical operation thereof, such a delay would not be allowed to disturb the proper controlling of the braking pressure according to the aforesaid reference wheel speeds, since the time duration of the braking pressure reducing signal is controlled so as to always correspond to the existing peripheral wheel deceleration so that a proper compensation for the delay time attended by the operation of the modulating means is effected and the stopping distance is prevented from becoming longer, thereby braking the vehicle in a very safe and efficient manner without locking the wheel.

Figures 3, 4:
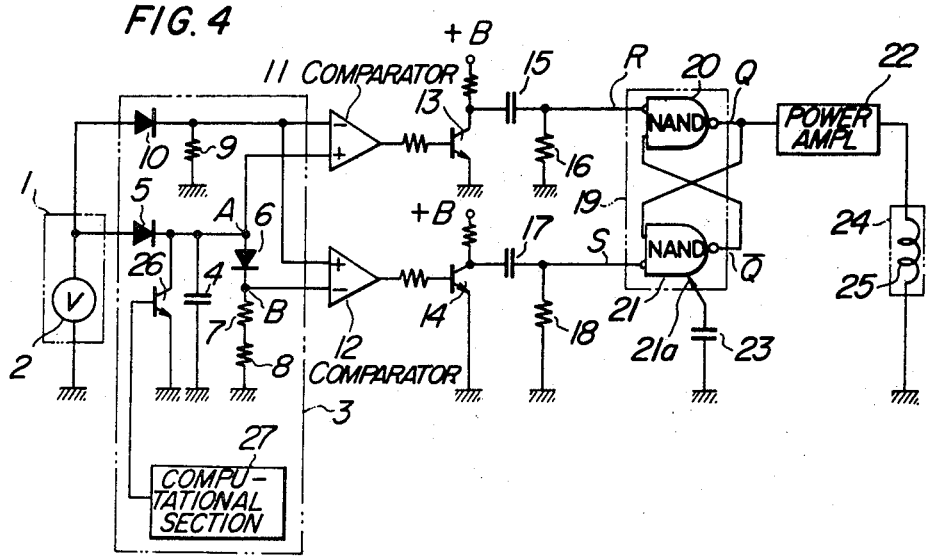

The above and other objects and advantages of the present invention will be readily apparent from the following detailed description of the present invention when read in conjunction with the accompanying drawings, in which:

FIGS. 1(a), 1(b), 2(a) and 2(b) are characteristic diagrams useful in explaining the principle of operation of a conventional anti-skid control system for vehicles;

FIGS. 3(a), 3(b) and 3(c) are characteristic diagrams useful in explaining the operating principle of the vehicle anti-skid control system according to the present invention; and FIG. 4 illustrates an electrical wiring diagram of an embodiment of the anti-skid control system of the present invention.

The present invention will now be explained with reference to the illustrated embodiment. In the first place, the operating principle of the device of the present invention will be explained with reference to FIGS. 3(a), 3(b) and 3(c) in which the abscissa represents the time $t$. In FIG. 3(a) the ordinate represents the wheel speed $v$ which is to be controlled, while in FIGS. 3(b) and 3(c) the ordinates represent the braking pressure reducing signal. With the conventional device, the instant the wheel speed $\alpha$ attains a value greater than the value of a predetermined deceleration, the pressure reducing signal is generated as shown in FIG. 3(b) so that the wheel speed $\alpha$ rises again as shown by a broken line, thereby terminating the pressure reducing signal after a very short period of time, i.e., at a time $t_5'$. This involves, as previously mentioned, a considerable danger of locking the wheel due to the delay attended by the operation of braking pressure reducing means, for example. To solve this difficulty, according to the present invention, a first reference wheel speed $\beta_1$ and a second reference wheel speed $\beta_2$ are preset such that when the wheel speed $\alpha$ has attained a predetermined deceleration the first reference wheel speed $\beta_1$ taken on that wheel speed as its initial speed and drops with a deceleration corresponding to said predetermined deceleration, whereas when the wheel speed $\alpha$ has attained the predetermined deceleration the second reference wheel speed $\beta_2$ lower than the wheel speed $\alpha$ by a preset speed difference $v_0$ at a time $t_1$ which is prior to the initiation of the braking pressure also assumes that wheel speed $\alpha$ attaining said predetermined deceleration as its initial speed and drops gradually with a deceleration corresponding to said predetermined deceleration. The relations among the wheel speed $\alpha$, the first reference wheel speed $\beta_1$ and the second reference wheel speed $\beta_2$ are such that prior to the initiation of braking operation the wheel speed $\alpha$ and the first reference wheel speed $\beta_1$ are equal and the second reference wheel speed $\beta_2$ is maintained at a value lower than the wheel speed $\alpha$ by the speed difference $v_0$.

Assuming now that the braking operation is initiated at the time $t_1$ so that at a time $t_2$ the wheel speed $\alpha$ attains a value in excess of a predetermined deceleration, assuming that wheel speed $\alpha$ at the time $t_2$ as its initial speed, the first reference wheel speed $\beta_1$ starts decreasing at a rate corresponding to the predetermined deceleration and the second reference wheel speed $\beta_2$ also starts to decrease maintaining a wheel speed lower than the first reference wheel speed by the speed difference $v_0$. Then, when the wheel speed $\alpha$ has decreased further until it becomes equal to the second reference wheel speed $\beta_2$ at a time $t_3$, the braking pressure reducing signal is produced as shown in FIG. 3(c), thereby causing the braking pressure to decrease. This braking pressure reducing signal remains on until the wheel speed $\alpha$ has risen again and become equal to the first reference wheel speed $\beta_1$ at a time $t_5$ during which time interval the braking pressure is continually reduced excepting during the delay time attended by the operation of braking pressure reducing means. On the other hand, while the time interval between the times $t_2$ and $t_3$ is the time during which the braking pressure reducing signal may be generated, no braking pressure reducing signal will be generated during said time interval so that the braking pressure is forcibly applied and maintained to decrease the wheel speed $\alpha$. Thus, once the braking pressure reducing signal is generated at the time $t_3$, it will be switched on and off to continuously reduce the braking pressure for a sufficient period of time at least until the wheel speed again rises and increases by a value in excess of the speed difference $v_0$, that is, until the wheel speed becomes equal to the first reference wheel speed $\beta_1$. In this way, the braking pressure reducing signal may be prevented from being generated successively at very short recurrent periods and moreover the delay attended by the braking pressure reducing means may not cause any inconvenience.

Next, the electric circuitry for the system of the present invention and its operation will be explained with reference to FIG. 4. In the figure, numeral 1 designates a wheel speed voltage generator comprising a DC generator 2 connected to the wheel, which generates a wheel speed voltage proportional to the wheel speed. Numeral 3 designates a reference wheel speed voltage generator; 4 a capacitor charged by the wheel speed voltage produced by the DC generator 2; 5 a diode for preventing the charge stored in the capacitor 4 from flowing back to the DC generator 2. Numeral 6 designates a diode; 7 and 8 designate resistors, the diode 6 and the resistors 7 and 8 being arranged to divide the wheel speed voltage across the capacitor 4 to thereby produce a first reference wheel speed voltage corresponding to the first reference wheel speed and a second reference wheel speed voltage corresponding to the second reference wheel speed, with the first reference wheel speed voltage appearing across the anode point A of the diode 6 and the second reference wheel speed voltage appearing across the voltage dividing point B of the cathode of diode 6 and the resistor 7. The difference voltage between the first and second reference wheel speed voltages, namely the voltage corresponding to the speed difference $v_0$ has a fixed value which is dependent on the forward voltage drop across the diode 6. The resistors 7 and 8 are selected to have a resistance value which is sufficiently higher than the discharge time constant of the capacitor 4 so that they may not constitute a discharging circuit for the capacitor 4. Numeral 9 designates a resistor across which the wheel speed voltage is produced, and a diode 10 having the same forward voltage drop characteristic as the diode 5 is provided between the DC generator 2 and the resistor 9 so that the wheel speed and the first reference wheel speed have equal value and the value of the voltage across the resistor 9 cannot be the same as that of the voltage generated by the generator 2. Numeral 11 designates a comparator for comparing the voltage generated across the resistor 9 with the first reference wheel speed voltage generated across the point A so that the output assumes a positive potential (e.g., +12 V) when the latter is greater than the former, while the output assumes a negative potential (e.g., −4 V) when the latter is smaller than or equal to the former. The comparator 11 may comprise an operational amplifier, differential amplifier or the like. Numeral 12 designates a comparator for comparing the wheel speed voltage generated across the resistor 9 with the second reference wheel speed voltage generated across the point B so that the output assumes a negative potential (e.g., −4 V) when the latter is greater than or equal to the former, while the output assumes a positive potential (e.g., +12 V) when the latter is smaller than the former. The comparator 12 may also comprise an operational amplifier, differential amplifier or the like. Numerals 13 and 14 designate transistors for buffer and waveshaping purposes with the collectors being connected through a resistor to the positive terminal +B of a battery installed in the vehicle. The collectors of the transistors 13 and 14 are also provided with a differentiation circuit comprising a capacitor 15 and a resistor 16 and a differentiation circuit comprising a capacitor 17 and a resistor 18, respectively. Numeral 19 designates a flip-flop serving as a memory circuit which comprises NAND circuits 20 and 21 each consisting of a DTL circuit, for example. The NAND circuits 20 and 21 have their output terminals Q and $\bar{Q}$ fed back to the input terminals of the opposite NAND circuits and the output terminal Q of the NAND circuit 20 is connected to a power amplifier 22. Designated as R is the reset terminal and S designates the set terminal. An expander 21a of the NAND circuit 21 is connected to the ungrounded end of a capacitor 23 for time delaying purposes which is designed to be transiently charged to reset the flip-flop 19 the instant that a switch, such as a key switch is closed to switch on the circuitry of the anti-skid control system to make ready for operation. Numeral 24 designates a braking pressure modulating means operated by electromagnetic means whose mechanical construction is not shown except an electromagnetic coil 25. When the electromagnetic coil 25 is not energized, the artificial braking operation which is to be effected upon the depression of the braking pedal by the driver will not be prevented in any way, thereby enabling normal braking action. On the other hand, when the braking pressure reducing signal amplifier by the power amplifier 22 is applied to the electromagnetic coil 25, the electromagnetic force of the electromagnetic coil 25 drives a three-way valve, for example, and this further brings servo means into operation to forcibly reduce the braking pressure even if the brake pedal is being pressed by the driver. Numeral 26 designates a transistor for discharging the charge on the capacitor 4 with time constants corresponding to the first and second reference wheel speeds. Thus, the discharge time constant of the capacitor 4, that is, the aforesaid predetermined deceleration can be determined as desired according to the magnitude of the base current for the transistor 26. Numeral 27 designates a computational section for varying the base current for the transistor 26 according to the information obtained while the vehicle is being driven, such as changing friction coefficients between road surfaces and tires and the slip factor of the wheel to thereby achieve the most ideal predetermined deceleration. However, the construction and operation of the computational section will not be explained in detail, since it does not constitute any part of the subject matter of the present invention.

With the arrangement described above, the operation of the system according to the present invention will now be explained. When the vehicle is at a standstill and the key switch is closed, the DC generator 2 does not produce any output in this state so that the output from the comparator 11 assumes a negative potential thus rendering the transistor 13 non-conductive to produce a differentiated output of positive potential across the resistor 16 of the differentiation circuit. At the same time, the output of the comparator 12 assumes a negative potential so that the transistor 14 is rendered non-conductive to produce a differentiated output of positive potential across the resistor 18 of the differentiation circuit. On the other hand, since the expander input terminal 21a of the NAND circuit 21 will be momentarily at a low potential almost zero potential, (hereinafter referred to as a "0" signal) while the time-delaying capacitor 23 is being charged, a high potential (hereinafter referred to as "1" signal) appears at the output terminal $\bar{Q}$ of the NAND circuit 21, which 1 signal is then fed back to the input terminal of the NAND circuit 20 so that the NAND circuit 20 forms the negation of the logical product of the fed back 1 signal and a 1 signal applied at its reset terminal R thus producing a 0 signal at the output circuit terminal Q thereof. Since the input to the power amplifier 22 is the 0 signal, the electromagnetic coil 25 is not energized.

Then, as the vehicle starts running, the DC generator 2 generates a wheel speed voltage corresponding to the wheel speed and this wheel speed voltage charges the capacitor 4. In the non-braking condition existing before the time $t_1$ shown in FIG. 3($a$) when the brake pedal is not being pressed by the driver, the comparator 11 maintains a negative-potential output since the wheel speed voltage appearing across the resistor 9 and the first reference wheel speed voltage appearing across the resistor 9 and the first reference wheel speed voltage appearing across the point A are equal, while the output of the comparator 12 assumes a positive potential since the wheel speed voltage across the resistor 9 is higher than the second reference wheel speed voltage across the point B. Consequently, the flip-flop circuit 19 receives at its set terminal S a 0 signal which is the negative differentiated output produced across the resistor 18 at the instant that the output of the comparator 12 changed from the negative to positive potential, whereas a 0 signal is received at the reset terminal R since the output of the comparator 11 is maintained at the negative potential and does not induce differentiated voltage across the resistor 18. Thus, the flip-flop 19 remains in the state to which it was previously switched so that a 0 signal is produced at the output terminal Q and a 1 signal at the output terminal $\overline{Q}$. Consequently, the electromagnetic coil 25 is not energized in the non-braking condition described.

Then, when at the time $t_1$ in FIG. 3($a$) the driver depresses the brake pedal so that the brakes are applied, the output voltage of the DC generator 2 drops, thereby causing the charge previously stored in the capacitor 4 to discharge through the collector and emitter of the transistor 26 in accordance with the predetermined decelerations for the first reference wheel speed $\beta_1$ and the second reference wheel speed $\beta_2$ shown in FIG. 3($a$). This in turn causes the first reference wheel speed voltage appearing across the point A to gradually decrease in accordance with the first reference wheel speed $_1$ and the second reference wheel speed voltage appearing across the point B to gradually decrease in accordance with the Then, reference wheel speed $\beta_2$. When at the time $t_2$ the wheel speed voltage across the resistor 9 becomes lower than the first wheel speed voltage across the point A, a negative-potential differentiated output is produced across the resistor 16 at the instant that the output of the comparator 11 changes from the negative to positive potential and this 0 signal is then applied to the reset terminal R of the flip-flop 19. In this case, since the output of the comparator 12 is being at the positive potential, the set terminal S of the flip-flop 19 also receives a 0 signal by virtue of the zero or low positive potential across the resistor 18. Thus, the input signals to the reset terminal R and the set terminal S are both at 0 so that the signals at the output terminals Q and $\overline{Q}$ remain unchanged, that is, the 0 signal at the output terminal Q and the 1 signal at the output terminal $\overline{Q}$ and hence no braking pressure reducing signal is produced. Consequently, the electromagnetic coil 25 is not energized, thereby allowing the wheel speed to drop still further. The n, when at the time $t_3$ in FIG. 3($a$) the wheel speed voltage becomes lower than the second reference wheel speed voltage across the point B, a 0 signal is applied to the reset terminal R since the output of the comparator 11 is still at the positive potential, whereas the output of the comparator 12 changes from the positive to negative potential thus applying a 1 signal to the set terminal S. This in turn changes the output of the flip-flop circuit 19 so tha a 1 signal is produced at the output terminal Q and a 0 signal at the output terminal $\overline{Q}$. When this happens, the 1 signal or the braking pressure reducing signal generated at the output terminal Q is applied to the power amplifier 22 where the signal is amplified and then applied to the electromagnetic coil 25 to energize it so that the three-way valve and the servo means are actuated to forcibly reduce the braking pressure. This forced reducing of the braking pressure causes the wheel speed to start rising again to that at a time $t_4$ in FIG. 3($a$) the signal at the reset terminal R of the flip-flop 19 remains at 0 since the output of the comparator 11 is still at the positive potential, whereas the signal at the set terminal S changes to 0 since a negative-potential differentiated output appears across the resistor 14 in spite of the fact that the output of the comparator 12 has changed from the negative to positive potential. Consequently, the output terminals Q and $\overline{Q}$ maintain the 1 and 0 signals, respectively, thereby allowing the braking pressure reducing signal to be continuously produced. Thus, in the condition existing at the time $t_4$, the braking pressure is allowed to decrease further. Then at a time $t_5$ in FIG. 3($a$) at which the wheel speed voltage exceeds the first reference wheel speed voltage, the instant the output of the comparator 11 changes from the positive to negative potential a positive-potential differentiated output appears across the resistor 16 thus applying a 1 signal to the reset terminal R. At this time, the set terminal S receives a 0 signal since the output of the comparator 12 has assumed the positive potential previously. This switches the flip-flop circuit 19 so that the signals at the output terminals Q and $\overline{Q}$ change to 0 and 1, respectively, thereby terminating the braking pressure reducing signal. In other words, a braking pressure restoring signal for allowing reapplication of the braking pressure is produced, thereby deenergizing the electromagnetic coil 25 and thus reapplying the braking pressure. Thereafter, this braking pressure reducing operation takes place whenever the wheel speed voltage becomes lower than the second reference wheel speed voltage.

What we claim is:

1. In an anti-skid control system for vehicles having lock detecting means for detecting a tendency for the wheel to lock and for producing a braking pressure reducing signal for reducing the braking pressure, and braking pressure modulating means for receiving the braking pressure reducing signal from said lock detecting means to reduce the braking pressure, a combination comprising:

a wheel speed voltage generator for producing a wheel speed voltage corresponding to the wheel speed, a reference wheel speed voltage generator for generating a first reference wheel speed voltage corresponding to a first reference wheel speed and for also generating a second reference wheel speed voltage corresponding to a second reference wheel speed, said first reference wheel speed voltage being such that when said wheel speed voltage has attained a predetermined deceleration, said first reference wheel speed voltage decreases from an initial value corresponding to the wheel speed voltage in existance when said predetermined deceleration is detected, said second reference wheel speed voltage being lower than said reference wheel speed voltage by a value corresponding to a predetermined constant speed difference, a memory circuit, a first comparator means for comparing the second reference wheel speed voltage with said wheel speed voltage thereby to set the memory circuit, and second comparator means for comparing the first reference wheel speed voltage with said wheel speed voltage thereby to reset the memory circuit, said memory circuit being connected for generating a braking pressure reducing signal when the output thereof changes according to the result of said comparisons in said first comparator means and for producing a braking pressure restoring signal when the output thereof changes according to the result of the other of said comparisons in said second comparator means.

2. An anti-skid braking control system for wheeled vehicles, said system comprising:

wheel speed generating means for producing a wheel speed signal representing the actual speed of at least one wheel, reference signal generating means connected to receive said wheel speed signal and to produce first and second reference signals therefrom, said second reference signal being a predetermined constant increment lower in value than said first reference signal and both of said first and second reference signals being controllably decreased after said wheel speed signal attains a predetermined deceleration during a braking operation, first comparator means connected to compare said wheel speed signal with said first reference signal and to produce first output signals corresponding thereto, second comparator means connected to compare said wheel speed signal with said second reference signal and to produce second output signals corresponding thereto, and memory means connected to receive said first and second output signals and to produce a brake releasing signal therefrom.

3. An anti-skid braking control system as in claim 2 wherein said memory means is connected to cause the brake releasing signal to begin when the wheel speed signal falls below said second reference signal and to thereafter continue until said wheel speed signal rises above said first reference signal.

4. An anti-skid braking control system as in claim 2 wherein said reference signal generating means comprises:

a storage capacitor having a controlled discharge circuit, means for charging said storage capacitor from said wheel speed signal, and voltage divider means comprising a constant voltage drop diode connected across said storage capacitor for providing said first and second reference signals.

5. An anti-skid braking control system as in claim 2 wherein said memory means comprises a flip-flop having a set input connected to the output of one of said comparator means and a reset input connected to the output of the remaining one of said comparator means.

6. An anti-skid braking control system for wheeled vehicles, said system comprising:

wheel speed generating means for producing a wheel speed signal representing the actual speed of at least one wheel, reference signal generating means connected to receive said wheel speed signal and to produce first and second reference signals therefrom, said second reference signal being a predetermined increment lower in value than said first reference signal and both of said first and second reference signals being controllably decreased after said wheel speed signal attains a predetermined deceleration during a braking operation, first comparator means connected to compare said wheel speed signal with said first reference signal and to produce first output signals corresponding thereto, second comparator means connected to compare said wheel speed signal with said second reference signal and to produce second output signals corresponding thereto, and memory means connected to receive said first and second output signals and to produce a brake releasing signal therefrom, said first and second comparator means each comprising a differential amplifier delivering its output through a differentiation circuit.

* * * * *